Jan. 9, 1940.　　　C. S. HAZARD　　　2,186,069
AIR RELEASE FOR LIQUID MEASURING SYSTEMS
Filed Oct. 20, 1937　　　3 Sheets-Sheet 3
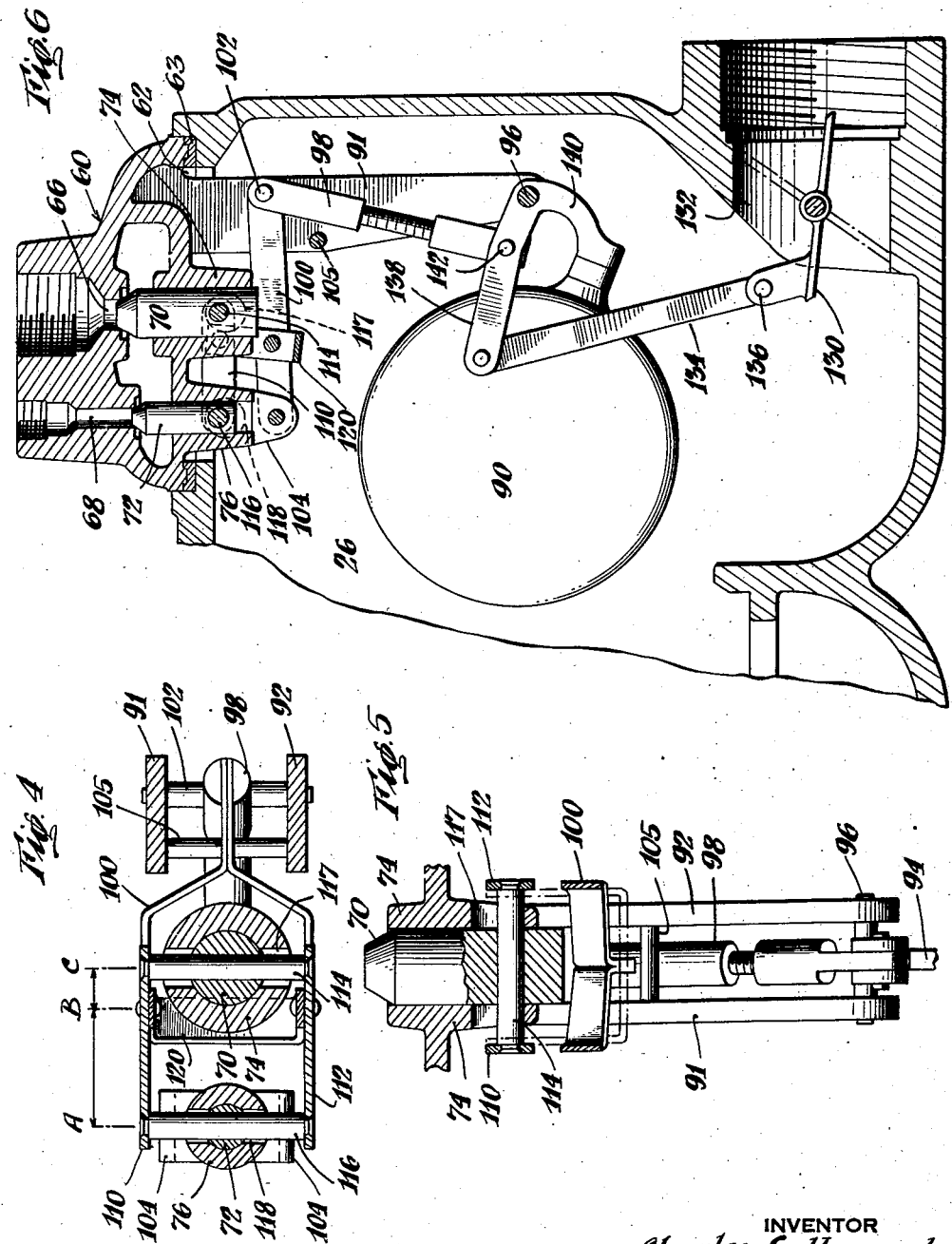
INVENTOR
Charles S. Hazard
BY
Hoguet, Neary & Campbell
ATTORNEYS Patented Jan. 9, 1940

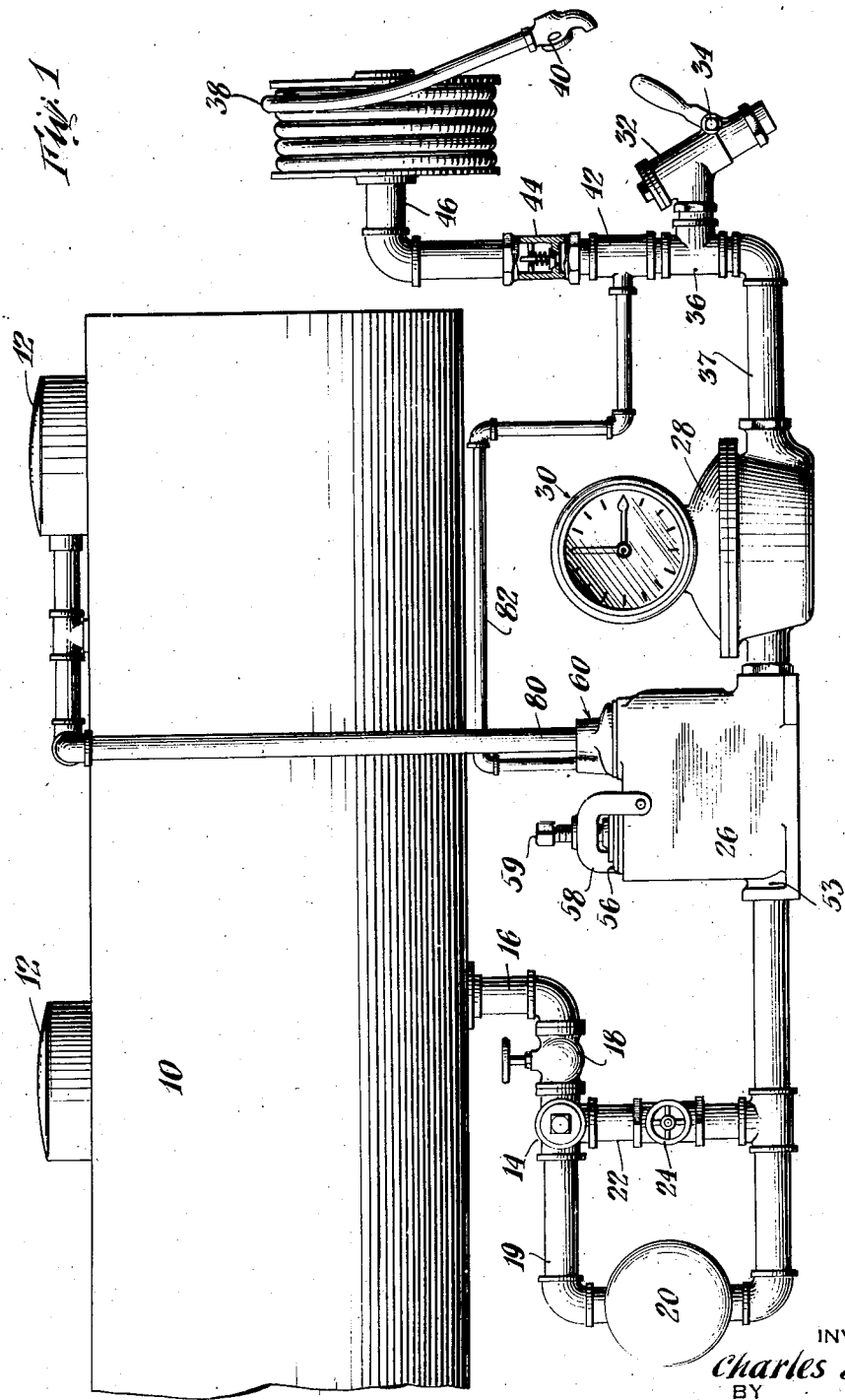

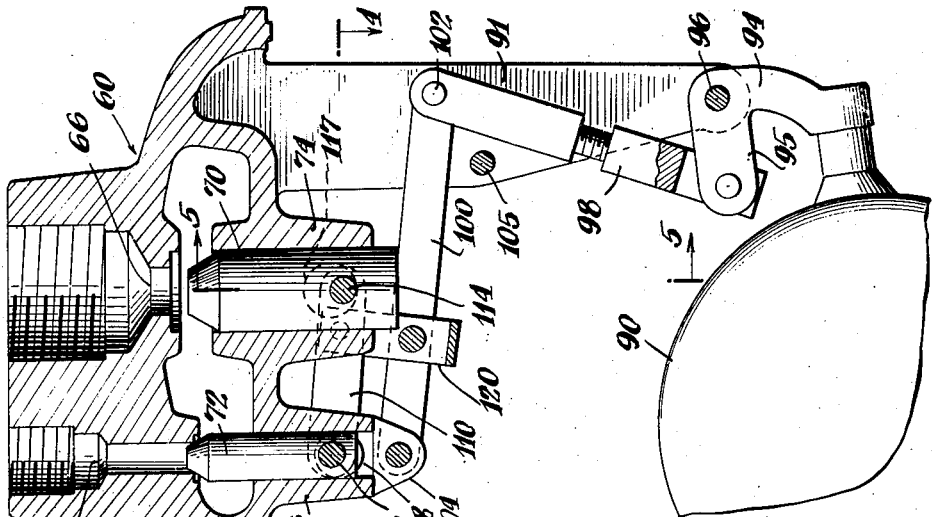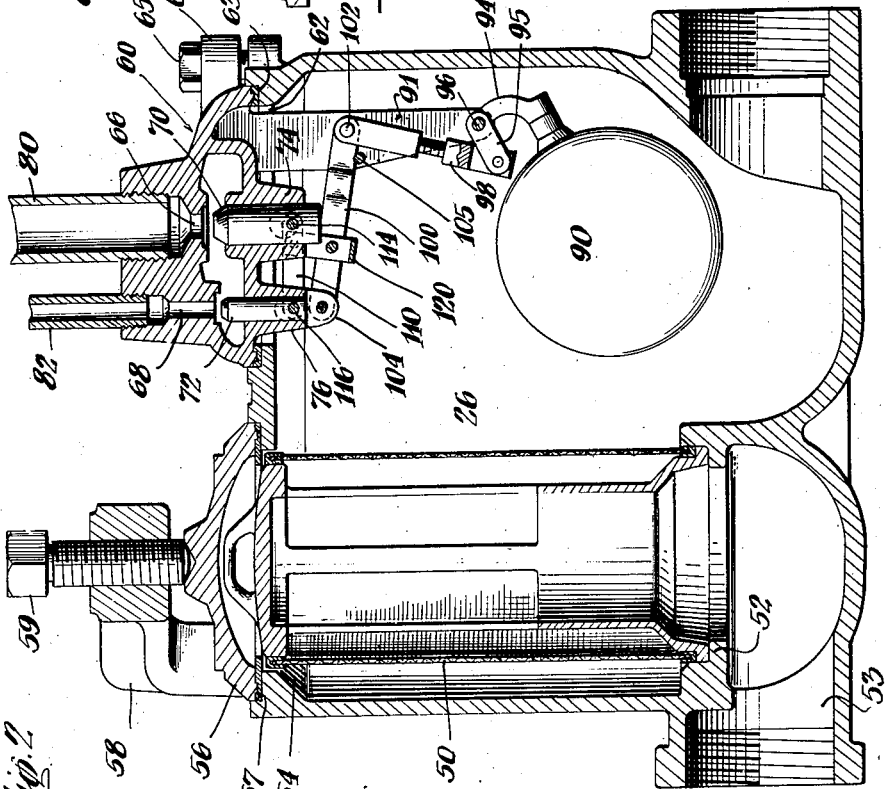

2,186,069

UNITED STATES PATENT OFFICE 2,186,069

AIR RELEASE FOR LIQUID MEASURING SYSTEMS

Charles S. Hazard, New York, N. Y., assignor to Neptune Meter Company, a corporation of New Jersey Application October 20, 1937, Serial No. 169,966

9 Claims. (Cl. 221—67)

This invention relates to systems for delivering measured quantities of liquid, and more particularly, to a combined pump and gravity dispensing system having an air release so associated with the system as to prevent entrance of air or gas into the measuring instrument.

In the use of meters to measure quantities of liquid being dispensed from reservoirs or tanks of tank trucks or the like, it is essentially important that air be excluded from the meter. This is necessary for the reason that air permitted to enter the dispensing system and pass through the meter will be registered just as if liquid were passed through the meter. One common way of permitting air to enter the meter is to allow the reservoir or tank to drain completely, thereby permitting air to be either forced or drawn through the meter, depending on whether a pump or gravity is depended upon for producing the flow of liquid through the meter.

Where liquid is drawn from the reservoir by a pump and forced through the meter, air will be drawn into the system by the pump when the reservoir becomes drained and be forced through the meter producing considerable inaccuracy in the quantity registered by the meter before the operator is warned of the drained condition of the tank. Again, when the reservoir is refilled or another compartment in the tank of a tank truck is connected to continue the dispensing operation, air remaining in the pump and meter connections will be forced through the meter, thereby adding further to the inaccuracy in the quantity registered by the meter.

When action of gravity is depended upon for dispensing liquid from a tank at a high level to a tank or receptacle at a low level, air will, in the ordinary system, be drawn through the meter when the tank at the high level becomes drained by syphonic action of the weight of the last part of the liquid still flowing in the discharge connection between the meter and the low tank. As a result, the meter will indicate an inaccurate reading. Again, when the high tank is refilled, a further inaccuracy will be produced in the reading of the meter by the air remaining in the system unless the air is eliminated by proper priming of the system before another dispensing operation is attempted.

The principal object of the invention is, therefore, to overcome these difficulties in liquid dispensing systems and prevent inaccuracies in meter readings by positively excluding air or gas from the meter and its connections.

It has also been found in previous combined pump and gravity dispensing systems when manually operated valves were necessary to change from one type of delivery to another, that erroneous manipulations of the hand-controlled valves by a careless or poorly informed operator would often result in permitting air to enter the system and be drawn or forced through the meter thereby introducing error in the reading of the meter. Another object of the invention is, therefore, to provide a simple combined pump and gravity dispensing system which is foolproof in that air cannot be introduced into the system so as to enter the meter upon converting the system from the pump to the gravity discharge type and vice versa.

A further object of the invention is to provide a gravity dispensing system with automatic means for releasing air or gas from being drawn through the meter by syphonic action.

A still further object of the invention is to provide a dispensing system with a valve arrangement operable to vent air or gas from the system and to establish equalized pressure on the inlet and outlet sides of the meter should the source of liquid supply become drained.

A still further and more specific object of the invention is to provide a combined pump and gravity dispensing system with an automatic means for providing an air or gas release adjacent the inlet to the meter and means for equalizing the pressure on both sides of the meter when the liquid level in the supply connection to the meter drops below a predetermined point so as to positively prevent the forcing or drawing of any air or gas into or through the meter.

The novel features characteristic of the invention are set forth with more particularity in the appended claims. The invention itself, however, both as to its organization and its method of operation, together with additional objects and advantages thereof, will best be understood from the following description of specific embodiments when read in connection with the accompanying drawings, in which Figure 1 is a view in elevation illustrating, diagrammatically, a dispensing system for a tank truck incorporating this invention.

Figure 2 is a view in vertical section of the float chamber showing the dual air release valves in open position.

Figure 3 is a view in vertical section, on a larger scale, of the dual air release valves showing the position of the valves when air is first released.

Figure 4 is a sectional view of the dual air release valves taken along line 4—4 of Figure 3.

Figure 5 is a view in vertical section of one of the dual air release valves taken along line 5—5 of Figure 3.

Figure 6 is a view in vertical section showing application of the dual air release valves in a slightly modified arrangement.

Referring to Figures 1 to 5 of the drawings, the combined pump and gravity dispensing system of this invention comprises a reservoir or a tank 10, which may be of the type used on tank trucks for delivering liquid petroleum products. The tanks used for delivering petroleum products are commonly formed with several compartments, each provided with an inlet 12 and connected to a manifold 14 by means of suitable piping 16, including a control valve 18. The manifold 14 is connected by means of the pipe 19 to a suction pump 20, of any well-known type, and to a pipe 22 controlled by the valve 24 bypassing the pump 20. Liquid may thus be withdrawn by means of the suction pump 20 or be allowed to flow by action of gravity through the by-pass 22 from one or another, or from two or more, of the tank compartments at one time for delivery through an air release chamber 26 and thence through a meter 28. The meter 28 is preferably of the oscillating piston or disc type, but may be of any other well-known type, for actuating a register 30 to indicate the quantity and/or cost of the liquid dispensed.

A gravity discharge nozzle 32, which is provided with a self-closing valve 34 is connected by means of a T connection 36 and a pipe 37 to the delivery or outlet side of the meter 28. A dispensing hose 38, having a valve-controlled nozzle 40, is also connected to the delivery side of the meter by means of the T connection 36, a second T connection 42, a back pressure valve 44 and a hose reel supporting pipe 46. The back pressure valve 44 is located closely adjacent the gravity discharge nozzle 32 so that when it is desired to deliver liquid by action of gravity, the valve 44 will prevent the liquid in the hose 38 from being drained. It is important to keep the meter and the discharge connections between the meter and the nozzles filled with liquid so that the quantity of liquid delivered during each dispensing operation corresponds exactly with the quantity registered by the meter.

The air release chamber 26 (Figure 2) is provided with an appropriate strainer 50 supported on a ledge 52 surrounding the liquid inlet 53 to the chamber. The upper portion of the chamber is provided with an opening 54 through which the strainer may be removed for inspection and cleaning purposes. A closure 56 is secured in sealing relation over the opening 54 by means of a gasket 57 and any appropriate securing device, such as a clamping member 58 containing a set screw 59, for urging the closure against the gasket 57. Adjacent the strainer opening 54 in the upper wall of the chamber 26 is mounted a dual air release block 60 in a second opening 62 and held in sealing relation thereto against a gasket 63 by means of clamping lugs 64 and bolts 65.

The dual air release block 60 is provided with two ports 66 and 68 controlled by two valves, a large valve 70 and a smaller valve 72, which are guided for vertical movement relative to the ports 66 and 68 in guide castings 74 and 76, respectively. The port 66 is connected by means of a pipe 80 for venting air or gas from the chamber 26 to the upper portion of one or more of the compartments within the tank 10. The port 68 is connected by a pipe 82 to the T connection 42 on the delivery side of the meter 28 and closely adjacent the gravity discharge nozzle 32 for equalizing the pressure on the inlet and outlet sides of the meter under certain conditions to be described later.

The movement of valves 70 and 72 is controlled by a float 90 pivotally supported by means of the bell crank 94 rotatably mounted on pin 96 secured on the arms 91, 92 which depend from the block 60. Pivotally connected to the other arm 95 of the bell crank 94 is an adjustable rod 98 pivotally connected to one end of the lever 100 at 102, the opposite end of lever 100 being pivotally mounted on lugs 104 depending from the block 60. The lever 100 is bifurcated, as shown in Figures 4 and 5, so that the two branches thereof may straddle the valve guide castings 74 and 76. A pin 105 is mounted between the arms 91 and 92 to limit the downward movement of lever 100 and float 90. The valves 70 and 72 are connected to each other by means of a pair of links 110, 112 and pins 114, 116. The pins 114 and 116 extend transversely through the valves 70 and 72, respectively, with the links 110 and 112 pivotally connecting the pins on opposite sides of the valves. A U-shaped bracket 120 pivotally connects the links 110, 112 to the two branches of lever 100, the connection between the bracket and the links being closer to the large valve 70 than to the small valve 72. This relationship is illustrated in Figure 4, the distance AB being much greater than the distance BC. The valve guides 74 and 76 are provided with stops in the form of the transverse openings 117 and 118, respectively, through which the valve pins 114 and 116 extend, the engagement of which operate to limit the downward movement of the valves, as illustrated in Figures 2 and 5.

In operation, the areas of the two valves and the leverage differences AB and BC are so proportioned that for any given pressure within the chamber 26, the larger valve 70 will always open first. Assuming the valves to be closed and the float in its high position, the downward movement of the float 90 will exert a pull on the links 110, 112 at B. Due to the unequal distances between the bracket connection at B and the two valves, the larger valve 70 will be unseated first to vent the chamber of accumulated air or gas. If the float should then ascend due to a rising liquid level, the valve 70 would again be seated. If, however, the float should continue to move downwardly because of a descending liquid level, the links 110, 112 would pivot on pin 114, when the pin is stopped by the lower edge of hole 117, thereby unseating the smaller valve 72. The unseating of the valve 72 opens the by-pass formed by the port 68, pipe 82 and the T connection 42 which operates to equalize the pressure on opposite sides of the meter, thereby stopping flow of liquid through the meter.

The dual air release mechanism is so adjusted as to first vent the chamber 26 of accumulated air or gas by opening the large vent valve 70 when the liquid level within the chamber descends below a predetermined point and to stop flow of liquid through the meter 28 by actuating the valve 72 should the float descend below a still lower predetermined point. In this way a sufficient quantity of liquid is always maintained in the chamber 26 so as to keep the liquid level well above the highest point within the measuring chamber of the meter, thereby positively preventing the entrance and passage of air or gas through the meter.

When the pump discharge delivery is to be used, the valve 24 is closed, the appropriate valve 18 opened and liquid withdrawn from one or another of the tank compartments, as the case may be, by the pump 20 and delivered into the chamber 26 through the strainer 50. If the valves 70 and 72 should be unseated due to an existing low liquid level, the incoming liquid will soon seat the valves by upward movement of the float 90. The dispensing system would then be ready to deliver liquid through the dispensing hose 38.

When the tank compartment becomes drained and the pump begins to draw air or gas from the compartment and forces it into the air release chamber 26, the float 90 will descend with the falling liquid level to a predetermined point where the large vent valve 70 will be unseated. The discharge of air through the large port 66 will lower the pressure in the delivery side of the system sufficiently to permit the spring-loaded valve 44 to close and prevent further flow of liquid through the meter 28. If the level of the liquid in the chamber 26 should descend to a point sufficiently low to cause the small valve 72 to also be unseated, the back pressure of the spring-loaded valve 44 would compel all the air being delivered by the pump to be vented through the large port 66, thereby maintaining the hose 38, as well as meter 28, filled with liquid.

If the action of gravity is to be relied upon for dispensing liquid from the tank compartment, the by-pass valve 24 is opened and liquid allowed to flow by gravity from the tank compartment through the by-pass 22 to the chamber 26 and thence through the meter 28 to the gravity discharge nozzle 32. If the tank compartment should become empty, the float 90 will descend with the falling level of the liquid to first open the valve 70 to vent the chamber 26 and later, as the level of the liquid continues to descend, to open the valve 72, thereby breaking the syphonic action of the gravity discharge at a point closely adjacent the gravity discharge nozzle 32 on the delivery side of the meter. The opening of the valve 72 permits air to be drawn into the pipe 82 from the chamber 26 and the pipe connection 80 by the descending liquid in the discharge hose that would ordinarily be connected to nozzle 32 for gravity operation. Thus, the gravity discharge hose would be drained up to its connection with the nozzle 32, while at the same time equal pressure will have been established on the inlet and outlet sides of the meter, thereby positively preventing air or gas from being drawn into and through the meter.

In certain pump discharge installations, it has been found objectionable to have a spring-loaded back pressure valve, as illustrated at 44 in Figure 1, due to its flow restricting characteristics. A modified form of the invention has, therefore, been illustrated in Figure 6 permitting the spring-loaded back pressure valve to be replaced by an unloaded check valve. This is accomplished by providing a butterfly valve 130 to control the outlet 132 of the chamber 26 which communicates with the inlet side of the meter 28. A connecting rod 134 is pivotally connected to the butterfly valve at 136 and to an extended arm 138 of the bell crank 140, which is pivotally supported on arms 91, 92 by the pins 96. The float 90 is connected to the other arm of the bell crank 140 while the adjustable rod 98 is connected for pivotal movement to the arm 138 at 142.

In the operation of the modified form of the invention, the connecting mechanism is so adjusted that the large vent valve 70 will first open the vent port 66 when the float descends to a predetermined point, and if the liquid level continues to fall, the valve 72 will be unseated and butterfly valve 130 closed by the further descent of the float 90. The butterfly valve 130 in closing will, of course, prevent further flow of liquid through the meter, thereby positively excluding air from entering the meter. The closing of the valve 130 also adds to the resistance presented by friction in the hose reel to insure discharge of all the air delivered by the pump after draining a tank compartment through the vent port 66.

If, in the modified form of the invention, gravity discharge of liquid is relied upon, the draining of a tank compartment will cause the float 90 to be lowered and thereby unseat the valves 70 and 72, in the sequence previously described, and close the valve 130. The opening of the by-pass 82 by unseating the valve 72 operates to break the syphonic action of the liquid remaining in the gravity discharge hose, which, if not broken, would tend to create a vacuum condition on the meter side of the valve 130 and cause highly volatile liquids, such as high grade gasolines, to vaporize and fill the meter and its connections with gas. The presence of gas vaporized from the liquid in the meter, however, would be undesirable because the gas, the same as air, would introduce an error in the quantity registration of the meter. The opening of the by-pass 82, therefore, prevents the creation of a vacuum condition which would be inducive to the vaporizing of the liquid in the meter and its outlet connection.

It is to be understood that when "air" is referred to in the appended claims such term is intended to include any gaseous medium that may be vaporized from the liquid being dispensed.

Although certain specific embodiments of the invention have been described, many modifications thereof are possible. For example, a single valve may be designed to control the two air release ports in the same manner as the dual valves are described and yet be within the purview of this invention. The invention, therefore, is not to be restricted except insofar as is necessitated by the prior art and the scope of the appended claims.

I claim:

1. In combination with a dispensing system having a meter, means for supplying liquid to said meter and means for delivering liquid from said meter; of a chamber interposed between said supply means and said meter, said chamber being provided with a pair of ports, valve means for controlling said ports, one of said ports forming a vent, means forming a by-pass between the other of said ports and said delivery means, a float in said chamber and mechanism connecting said float to said valve means for first opening one of said ports for venting said chamber should the level of the liquid descend below a predetermined point, and for opening said by-pass should the level of the liquid descend below a still lower predetermined point.

2. In combination with a dispensing system having a meter, means for supplying liquid to said meter and means for delivering liquid from said meter; of a chamber interposed between said supply means and said meter, said chamber having a pair of ports in the upper portion thereof, one of said ports forming a vent for said chamber, a duct providing communication between the other of said ports and a point in the system on the outlet side of said meter, a valve for each port, a float and mechanism connecting said valves to said float for first moving the vent control valve to open position for venting said chamber as the float descends below a predetermined level, and for then moving the other valve for establishing equal pressure on the inlet and outlet sides of said meter should the float descend below a still lower level.

3. In a dual air release for dispensing systems comprising a chamber having a pair of ports in the upper portion thereof, a valve for controlling each port, a floating link pivotally connecting said valves and means responsive to change in the level of liquid in said chamber for moving said link so as to open one of said ports as the liquid level descends below a predetermined point and for opening the other of said ports should the level of the liquid descend below a still lower point.

4. In a dual air release for dispensing systems comprising a float chamber having a pair of ports, a valve for controlling each of said ports, a floating link pivotally connecting said valves, a float and mechanism operatively connecting said float to said link at a point nearer one valve than the other for first moving one of said valves to open position as the float descends below a predetermined level and for then moving the other of said valves to open position should the float descend below a still lower level.

5. In a dual air release for dispensing systems comprising a float chamber having a pair of ports, a valve for controlling each of said ports, a float in said chamber, a link pivotally connecting said valves and means connecting said float to said link at a point between said valves so as to first open one of said valves when said float descends below a predetermined level and for then opening the other of said valves when the float descends below a still lower level.

6. In combination with a dispensing system having a meter, means for supplying liquid to said meter and means for delivering liquid from said meter; of a chamber interposed between said supply means and said meter, said chamber having a pair of ports in the upper portion thereof, one of said ports forming a vent for said chamber, means providing a by-pass between the other of said ports and a point in the system on the outlet side of said meter, a valve for each port, a link pivotally connecting said valves and means responsive to the liquid level in said chamber for moving said link to first open the vent control valve as the liquid level descends below a predetermined point, and thereafter to open the by-pass control valve should the liquid level descend below a still lower point.

7. In a dispensing system comprising a meter and means for establishing flow of liquid through said meter from a source of liquid supply; the combination of an air and liquid separator interposed between said meter and said source of liquid supply, valve controlled means for venting air from said separator, means providing a valve controlled by-pass about said meter in communication with said vent-providing means, a link pivotally connecting said valves, and a float operatively connected to said link at such a point that vertical movement of said float tends to move the vent valve prior to movement of the by-pass valve.

8. In a dispensing system comprising a meter and means for establishing flow of liquid through said meter from a source of liquid supply; the combination of an air and liquid separator interposed between said meter and said source of liquid supply, valve controlled means for venting air from said separator, means providing a valve controlled by-pass about said meter in communication with the upper portion of said separator and means responsive to a descending liquid level in said separator to first open said vent control valve and later to open said by-pass valve.

9. In a system for delivering measured quantities of liquid against a pressure head, a meter, means for forcing liquid through said meter, an air and liquid separator interposed between said meter and liquid forcing means, valve controlled means for venting air from said separator, means providing a valve controlled by-pass about said meter in communication with the upper portion of said separator, a floating link pivotally connecting said valves, and means responsive to changes in the level of the liquid in said separator for moving said link in a manner to actuate said valves in a sequential order.

CHARLES S. HAZARD.

CERTIFICATE OF CORRECTION.

Patent No. 2,186,069. January 9, 1940.

CHARLES S. HAZARD.

It is hereby certified that error appears in the printed specification of the above numbered patent requiring correction as follows: Page 1, second column, line 18, after the word "air" insert introduced into the system and for preventing air; and that the said Letters Patent should be read with this correction therein that the same may conform to the record of the case in the Patent Office.

Signed and sealed this 6th day of February, A. D. 1940.

(Seal)

Henry Van Arsdale,
Acting Commissioner of Patents.